(12) United States Patent
De Lima C.

(10) Patent No.: US 6,273,071 B1
(45) Date of Patent: Aug. 14, 2001

(54) FUEL CONSUMPTION OPTIMIZER AND CARBON DIOXIDE EMISSIONS REDUCER BASED ON AN AIR-VACUUM LIQUID COMPENSATION SYSTEM

(75) Inventor: Tito De Lima C., Caracas (VE)

(73) Assignee: F.C.O. International Corp., Tortola (VG)

(*) Notice: Subject to any disclaimer, the term of this patent is extended or adjusted under 35 U.S.C. 154(b) by 0 days.

(21) Appl. No.: 09/091,597
(22) PCT Filed: Dec. 19, 1996
(86) PCT No.: PCT/US96/20003
  § 371 Date: Sep. 14, 1998
  § 102(e) Date: Sep. 14, 1998
(87) PCT Pub. No.: WO97/22793
  PCT Pub. Date: Jun. 26, 1997

(51) Int. Cl.[7] .................................................. F02M 23/00
(52) U.S. Cl. ........................................................... 123/522
(58) Field of Search ............................................. 123/522

(56) References Cited

U.S. PATENT DOCUMENTS

| H1466 | 8/1995 | Stapf . | |
|---|---|---|---|
| 610,159 | * 8/1898 | Speer | 123/522 |
| 1,756,781 | * 4/1930 | Bergougnoux | 123/522 |
| 2,221,472 | * 11/1940 | Ennis | 123/522 |
| 2,300,774 | * 11/1942 | Cartmell | 123/522 |
| 2,312,151 | * 2/1943 | Cradtree et al. | 123/522 |
| 2,742,886 | * 4/1956 | Mcpherson | 123/522 |
| 3,282,033 | * 11/1966 | Seppanen | 123/522 |
| 3,338,223 | * 8/1967 | Williams | 123/522 |
| 3,395,681 | * 8/1968 | Walker | 123/522 |
| 3,961,609 | 6/1976 | Gerry . | |
| 4,167,166 | 9/1979 | Varner et al. . | |
| 4,172,438 | 10/1979 | MacGuire . | |
| 4,194,477 | 3/1980 | Sugiyama . | |
| 4,235,209 | 11/1980 | Ibbott . | |
| 4,312,317 | * 1/1982 | Jewett et al. | 123/522 |
| 4,373,500 | 2/1983 | Haynes . | |
| 5,313,926 | 5/1994 | Lin . | |

FOREIGN PATENT DOCUMENTS

| 2114571 | 10/1972 | (DE) . |
|---|---|---|
| 573243 | 3/1924 | (FR) . |
| 486720 | 6/1938 | (GB) . |

* cited by examiner

*Primary Examiner*—Noah P. Kamen
*Assistant Examiner*—Jason Benton
(74) *Attorney, Agent, or Firm*—Pillsbury Winthrop LLP (57) ABSTRACT

A booster container, an inlet nozzle for air entering the container and an outlet nozzle for air leaving the container, a body of liquid within the container body, the body of liquid being disposed remotely from the inlet nozzle and the outlet nozzle, a plurality of deflectors located within and attached to the container body, forming passages through which the air travels and at least one of the deflectors being partially immersed in the body of liquid. Air passes around the deflectors into the body of liquid and is influenced by a vacuum from an intake manifold, wherein the air forms bubbles in the liquid and leaves the body of liquid under vacuum and passes through the passages formed between the deflectors and leaves the booster container through the outlet nozzle connected to the intake manifold of an internal combustion engine.

40 Claims, 1 Drawing Sheet

FIG. 1

FUEL CONSUMPTION OPTIMIZER AND CARBON DIOXIDE EMISSIONS REDUCER BASED ON AN AIR-VACUUM LIQUID COMPENSATION SYSTEM

This application is the national phase of international application PCT/US96/20003 filed Dec. 19, 1996 which designated the U.S.

FIELD OF THE INVENTION

The present invention concerns internal combustion engines, and more particularly, this invention refers specifically to the optimal reduction of fuel consumption derived from the increase of volumetric and combustion efficiencies, produced by additional air supplied through the intake manifold, while reducing the work and vacuum effort of pistons. All of which allows a simultaneous reduction of fuel and a noticeable power boost. The system is intended to work for most internal combustion engines.

BACKGROUND OF THE INVENTION

1. Definition of Terms

A) Internal combustion engines: in general refers to engines that naturally aspirate with a throttle valve controlling and restricting the air flow through the intake manifold and where fuel does not partake in a lubricant function.

B) Any fuel delivery system, for example, carburetor, throttle body injection continuous injection system, multi-point injection, pulsed electronic fuel injection, mixer dosifier of air for natural gas or liquid petroleum gas, diesel direct injection.

C) Any fuel: refers mainly to fuels inflammable by a spark of ignition, such as: gasoline, methanol, ethanol, or gasohol mixtures, natural gas, liquid petroleum gas. In case of any reference to diesel or fuel-oil, we will refer specifically to them.

2. Background Discussion

It is common knowledge that for a conventional combustion engine, the ideal combustion could be defined by the relation between: the maximum amount of energy generated by the minimum amount of fuel mixed with the exact amount of oxygen present in the air-fuel mixture, uniformly distributed in each cylinder to produce the total burning of fuel, while a minimum production of solid residues and polluting emission results. This definition would represent reaching almost 100% efficiency in a combustion process. For the purpose of reaching maximum efficiency and a significant reduction of fuel consumed by internal combustion engines, it is convenient to discriminate the main factors involved in the combustion process as well as the problems and limitations of operational design inherent to engines and how it affects their internal combustion and performance.

3. Oxygen, Essential Factor

In order to burn fuel and for combustion to take place, it is necessary for a carburetant to be present. Specifically, the carburetant is oxygen, which is an indispensable element for enabling combustion to take place. Combustion is an oxidation process where the elements carbon and hydrogen present in the oxidation reaction provide high energy production and harmless byproducts (carbon dioxide and water).

Rich Condition—if we work with an excess of fuel and there is not enough oxygen to burn all the fuel, it will result in certain portions of uncombusted fuel, which will form carbon deposits in the combustion chamber and highly toxic emissions such as residual hydrocarbons and carbon monoxide expelled to the environment through the exhaust system. Also, engines will consume a greater amount of inefficient fuel wasted in producing harmful byproducts and not in generating energy.

Lean Condition—Due to the fact that all the oxygen used in internal combustion engines is supplied by atmospheric air with the inconvenience that air can only supply approximately 20% of oxygen together with an unwanted 80% of nitrogen, it would be reasonable to supply excess of air to burn all the fuel entering the combustion chamber. But, the problem is that excess air generates high combustion temperatures and both elements nitrogen and oxygen combine, thereby forming nitrogen oxides (NOx emissions) which are harmful byproducts, key element of smog. Both working conditions (rich and lean) produce harmful emissions contributing to smog formation, in contrast to the clean air desired.

Stoichiometric Ratio

For today's engines, with the increased emphasis on fuel economy and reduced emissions, the air-fuel ratio has to be controlled much more carefully. The ideal air-fuel ratio, the one which yields the most complete combustion and the best compromise between rich and lean mixtures is 14.7:1, the mixture is neither rich nor lean, this ratio is expressed in terms of mass. Modern technologies and vehicle manufacturers express that the stoichiometric ratio can also be described in terms of the air requirements of engines, and calls this, the 'EXCESS AIR FACTOR' or LAMBDA. At the Stoichiometric Ratio, when the amount of air equals the amount required for complete combustion of fuel and there is no EXCESS AIR–Lambda=1. When there is excess air (air-fuel ratio leaner than stoichiometric) Lambda will be greater than one. When there is a shortage of air (air-fuel ratio richer than stoichiometric) then Lambda will be less than one. This concept of Lambda (the excess air factor) was created to support thinking in terms of the air requirements of engines working with electronic fuel injection where intake air-mass flow is measured and a computer determines the corresponding amount of fuel to be injected. Older carburetor systems tend to run richer than the ideal air-fuel ratio, where air flow through carburetors extracts proportional amounts of fuel from venturis. In other words, every time the term "Air" appears in this application, it should be understood, which way and how much oxygen is supplied to the engine and possible harmful byproducts affecting emissions.

Limitations of the Operational Design

This concerns, restrictions and inconveniences related to engine design that affect negatively the appropriate supply of "Air" for the combustion process promoting incomplete combustion and affecting regulated emissions. Main Limitation—It is well known that in carbureted and throttle body injected (Central Injection) engines, the fuel and the air, are supplied together by the fuel delivery system, where the vacuum low pressure is responsible for the aspiration and formation of an air flow drawn from the ambient (at atmospheric pressure), This intake air flow will receive the intake atomized fuel (from venturis or fuel injectors) in order to transport it, mixed in the air current running through the intake manifold for its later ignition at the combustion chamber. In multipoint fuel injection (Ported Injection) fuel is sprayed by injectors at ports located into the intake manifold very near to the intake valves. For both cases, older and latest fuel delivery systems, the main limitation is the throttle valve controls that restrict the unique air supply. This joint supply of fuel and restricted air creates an inconvenient interdependence between them, which in the end translates into limitations imputable not only to the design, but also to the way the engine performs and the way the fuel delivery system operates under different throttle positions and vacuum variables, generating problems such as: defective vaporization and adherence of liquid fuel to elbows, walls, and ports of the intake manifold; irregular distribution of air-fuel mixture to each of cylinders; rich or lean mixtures under different operational conditions. All these problems translate into partial burning of fuel resulting in certain portions of uncombusted fuel wasted in producing harmful byproducts. Furthermore, for carbureted engines it is impossible to increase the air flow, taken in through the fuel delivery system, without producing simultaneously extraction and aspiration of an additional amount of fuel. Consequently, this explains the inconvenient interdependence resulting from a joint supply of air and fuel, as well as removing the possibility of supplying additional air by restricted normal intake. On the other hand, in order to reduce the fuel consumption, obviously the amount of fuel delivered should be reduced. To manage this, we must reduce the diameter of the passages located at internal parts (gillets, venturis, or injectors), through which the fuel runs in the fut. I delivery system, or shorten the pulse time (Electronic Injection). Such a reduction could be so noticeable, that it would be very easy to find the proper amount of restricted air to match and carry out the combustion of all the reduced amount of fuel, with a minimum production of residues and effluents, but also, energy excepted by explosion will be reduced, thus generating less power. From the above we can derive that a reduction of fuel 'per se', implies a sacrifice in the power of the engine. Such problems and limitations just mentioned are subject to corrections and improvements, this is one of the objectives of this invention.

4. Brief Summary of Prior Art

During several years, numerous efforts have been made focused mainly in developing methods to reduce gasoline consumption, while improving efficiency of combustion and at the same time, reducing the exhaust emissions and fumes expelled-to the environment. A great number of new techniques and a diversity of inventions have been implemented and developed, in order to correct certain deficiencies of carbureted and central injected engines, such as: incomplete vaporization of gasoline, air-fuel mixtures for different driving conditions, irregular distribution of fuel in the cylinders, lack of air during acceleration or oxygen insufficiency. In order to overcome these deficiencies, various devices have been developed to generate micro-turbulences with air at sonic speeds, vaporized hot air, air injection controlled by: diaphragms, valves, pistons, or passages with narrow opening and small orifices. Other methods and devices inject pure oxygen alone or mixed with air. After having analyzed each of these systems and devices in detail, it is possible to observe that none of them have been designed to reduce the a mount of fuel 'per se' entering the combustion chamber. Nevertheless, we can observe that they allow the entrance of previously filtered air in some cases at intervals and in other cases in a continuous pattern, while in yet other cases the ambient air is introduced using pressure. Most of these are connected below the fuel delivery system, either through the P.C.V. valve or directly to the intake manifold. But, all of them impose limitations and restrictions by blocking the running of the necessary volume of additional air.

To understand the restrictive supply of air through devices, it would be convenient to explain the meaning of vacuum in terms of Absolute Pressure. The manifold vacuum is currently specified in inches of Mercury (In. Hg). "29.92 in. Hg" is the difference between standard atmospheric pressure at sea level and absolute vacuum. Using Atmospheric pressure as a baseline zero, any lower manifold pressure is expressed as a negative value-vacuum implying a strong, sudden pull of air. On the other hand, using Absolute Pressure as a reference point, the piston on its intake stroke is creating a very low pressure in the cylinder approaching zero Absolute Pressure, or Maximum Absolute Vacuum. Outside the engine, atmospheric pressure is always a positive value, and it is continuously pressing over the throttle valve which separates both opposite pressures and regulates the intake air flow. Incoming air is matched with fuel to produce power and an increase in r.p.m. replacing the lost vacuum, by this form the engine works in a compensated way. The undiscriminated supply of additional air through an alternate way (devices), would produce a drastic reduction of negative pressure of vacuum (Low Absolute Pressure), by its abrupt annulment with the positive atmospheric pressure (High Absolute Pressure) causing sudden compensation (the quick equalizing) of both pressures without raising the r.p.m., provoking failures and disfunction of the engine until it is turned off.

Advanced Technologies. Government standards for emissions and fuel economy are becoming increasingly important to save fuel and clean air, and to preserve the global environment. During the past three decades, car makers have been continuously working to meet mandated fuel economy standards and tighter emission limits for the 90's. Computerized engine control and fuel injection are the only way to meet those needs. In contrast with carburetors, the throttle valve regulates (restriction) only air flows into the engine, and fuel injection systems deliver fuel by forcing it into the incoming air stream. Incoming air is measured by air flow or air mass sensors, signals received by computer determine the fuel to be delivered in precise amounts based directly on that measure. Multipoint systems delivers fuel at the engine intake ports near the intake valves. This means that the intake manifold delivers only air, in contrast to carburetors or single-point (Central) fuel injection systems in which the intake manifold carries the air-fuel mixture. As a result, these systems offer the following advantages: (1) Reduced air-fuel ratio variability; (2) Fuel delivery matched to specific operating requirements; (3) Improved driveability by reducing the throttle change lag which occurs while the fuel travels from the carburetor or throttle body to intake ports; (4) Increased fuel economy by avoiding condensation of liquid fuel on interior walls of the intake manifold (manifold wetting); (5) Engine run-on is eliminated when the key is turned off. Additionaliy, the exhaust oxygen sensor (Lambda sensor) and the control module (Computer) form the air-fuel ratio closed-loop system that continually adjusts the mixture by changing the fuel-injector pulse time. In normal warm operation the oxygen sensor generates a higher voltage because the mixture is rich, so the control module reduces pulse time to make the mixture lean. Oxygen sensor voltage falls, so the control module increases pulse time to enrich the mixture. Closed-loop air-fuel ratio control operates quickly and continuously to maintain the air-fuel ratio as close as possible to the stoichiometric, because this control cannot hold the air-fuel mixture within the required range. Successful operation of a three-way catalytic converter requires that the air-fuel ratio be maintained at Lambda=1. At this point the emissions of all three pollutants (NOx, CO and residual HC) is reduced to the lowest level. Because of tightening exhaust emissions regulations and the need for a three way catalyst, a Lambda sensor (exhaust gas oxygen sensor) is provided on virtually every car made since 1981, domestic or import, fuel injected or carbureted. Catalytic converters control emissions and reduce the need for engine tuning. In addition, government legislation established an average miles per gallon (mpg) standard to apply to the total fleet of cars each manufacturer delivers each year. Further, the target mpg standard rose each year, starting al 18 mpg in 1978, and rising up to 27.5 mpg in the 1990's. The obvious question: What is the reason? Harmful emissions under partial combustion control have been discussed above. NOx controlled harmless emissions and carbon dioxide (CO2-greenhouse effect) emission will be discussed below. Until recently, carbon dioxide (CO2) was considered a harmless emission. But now the greenhouse effect must be considered. Recent studies show that CO2 is accumulating in the upper atmosphere, trapping global heat much as glass traps heat in a greenhouse. Most experts consider that global warming of only a few degrees would have disastrous worldwide results.

The probable results are a rise in global temperatures, successive heat waves, and iceberg melting, which would raise Ocean levels to flood seaside properties worldwide. Any burning of fossil fuel (even properly combusted) produces carbon dioxide. About 750 cu. ft. of invisible $CO_2$ (twice the volume of a typical car) are expelled through exhaust systems for each gallon of fuel burned. Unlike the other combustion by-products (HC,CO,NOx), the $CO_2$ cannot be treated to eliminate its harmful effects. Reduction in $CO_2$ requires reducing the amount of fuel burned. It is an object of this invention to improve efficiency to its 'optimal level'.

The provision of a nonrestrictive device that allows entry of additional air, via the intake manifold, avoiding the internal decompensation of the engine, but that at the same time allows a 'per se' fuel-CO2 reduction, without a loss of power, is another principal objective of this invention.

OBJECTS OF THE INVENTION

During the past half century, until today, internal combustion engines that work like air-vacuum pumps have been used. A piston traveling downward on its intake stroke creates a vacuum (pressure lower than atmospheric) in the cylinder. In theory, the amount of air which is taken in by an engine is determined by the displacement and the r.p.m. The term used to describe how well the engine aspirates air and the true value as compared to the theoretical 100%, is 'Volumetric Efficiency'. In practice, several factors reduce the theoretical maximum: (1) Valve timing limits the amount of air which can be taken-in on the downward displacement stroke or pumped out on the exhaust stroke. (2) Volumetric efficiency is reduced on the intake side by: the air filter, the choke throttle valve (carburetors), the air flow sensor (vane type, and sensor plates used in fuel injection), the throttle valve, and the intake manifold and ports. They impede the free flow of air into the combustion chamber. (3) Volumetric efficiency is further reduced by the restrictions of the exhaust system: exhaust manifolds, catalytic converters, mufflers. Even more, today's most sophisticated engines run Wide Open Throttle (WOT) in the 70–80% range; while old carbureted systems run WOT in the 50–60% range. When the throttle valve is fully open, it causes almost no restriction, and full atmospheric pressure is admitted to the intake manifold. This creates the greatest possible difference between manifold pressure and cylinder pressure, and the greatest intake air flow. The least intake air flow occurs when the throttle valve is nearly closed. The restriction of the throttle valve limits the effect of atmospheric pressure. There is little difference between manifold pressure and the, low pressure (vacuum) in the cylinders, obviously air flow is very low. At this point we could ask, what is the Volumetric Efficiency range for this condition? Certainly not all engines run at WOT conditions. Normally, engines run WOT (maximum volumetric efficiency) just for a short time; most of the time they run at: idling, coasting, or part-throttle acceleration (throttle is nearly closed, equals low volumetric efficiency). This restrictive operation causes an extreme vacuum condition (low pressure) implying that pistons must aspirate from a practically closed inner space that at the same time is empty and lacks air. This occurs during their downward displacement (intake stroke), resulting in negative work and effort, that is to say, inefficient work which implies a waste of the energy generated by the explosion, while additional amounts of fuel are consumed producing this wasted energy. The vacuum has the capacity to aspirate constantly variable volumes of air depending on the internal displacement and the number of revolutions per minute (rpm) of the engine. For a four stroke engine, the internal total volume of cylinders should be filled within two revolutions. Since the production of the vacuum is constant, this implies a constant inefficiency and waste of unnecessary fuel-working energy in each revolution of the engine.

From this we can assert that even if ideally a 100% efficiency could be reached during the combustion, the resulting power could never correspond to the power that could be generated by 100% of the energy excerpted from the explosion.

To sum up, it is possible to describe the combustion that takes place in any conventional engine as an incomplete and defective process due mainly to the inadequate and restricted supply of ambient air which carries the carburetant oxygen which is absolutely necessary in a variable volume-mass, but always enough to carry out the total burn of the variable volume-mass of any type of fuel delivered through any kind of fuel delivery system, in accordance with the operating conditions of the said engine. In relation to this incomplete combustion there are several problems and limitations that must be overcome:

1. Insufficient arid restricted air supply.
 2. Non-burned fuel consumption without any energy production.
 3. Wasted fuel producing harmless and harmful emissions.
 4. Close in conditions and internal extreme vacuum.
 5. Negative work and effort due to vacuum production.
 6. Combusted fuel consumption to producing wasted energy.
 7. Wasted energy to supply the negative work of pistons.
 8. Poor engine volumetric efficiency.
 9. Loss of power due to fuel reduction.
10. Engine failures due to decompensation (vacuum leaks).

In accordance to the solution of the problems and limitations previously expressed, the objective of the present invention is to provide a versatile system that can be adapted to most internal combustion engines. One that has been designed to supply variable volume-masses of clean air through an alternate non-restrictive way, where the air flow is regulated by the operative rotation (rpm) of the engines during different working conditions, while not provoking failure or disfunction due to decompensation. Such compensation system should improve and make the appropriate corrections to the problems previously mentioned.

SUMMARY OF THE INVENTION

This and other objectives, will be made clear in the following specification and claims, attributed to the "Fuel Consumption Optimizer and Carbon Dioxide Emissions Reducer" system, from here on referred to as "Air-Power Booster". This system is based on "The Air-Vacuum Liquid Compensation Device" of the present invention.

The fuel consumption optimizer and carbon dioxide emissions reducer, or "air-power booster" is a device for optimizing fuel consumption and reducing carbon dioxide exhaust emissions in an internal combustion engine, wherein a vacuum is generated when the engine is started. The device includes a booster container having a contained body, an inlet nozzle for air at atmospheric pressure entering the booster container and an outlet nozzle for air under low pressure vacuum leaving the booster container, a body of liquid within the container body, the body of liquid being located in a lower portion of the container body remotely from the inlet nozzle and the outlet nozzle, a plurality of deflectors located within and attached to the container body, forming passages through which the air travels and at least one of the plurality of deflectors is partially immersed in the body of liquid. The air leaves the body of liquid under vacuum low pressure and passes through passages formed between the plurality of deflectors and leaves the booster container through the outlet nozzle which is connected to the internal combustion engine. Most internal combustion engines have an intake manifold and a throttle reducing device. The air at atmospheric pressure enters the booster container and passes through an atmospheric pressure chamber and through a passage around at least said one of the deflectors into the body of liquid and is influenced in the body of liquid by low pressure vacuum from the intake manifold, which causes the air to form bubbles. The air leaves the body of liquid under the low pressure vacuum and passes through the passages formed between the plurality of deflectors and leaves the booster container through said outlet nozzle which is connected to the intake manifold of an internal combustion engine, whereby the air travels to the intake manifold under the low pressure vacuum. The liquid is unable to reach the outlet nozzle due to the configuration of deflectors. The booster container may be made of injection molded plastic polymer or other material or by another method, as known in the art. The plurality of said deflectors are positioned spaced away from each other, forming passages for air leaving the liquid to pass therebetween before exiting the container through the outlet nozzle.

A method for optimizing fuel consumption and reducing carbon dioxide exhaust emissions in an internal combustion engine having an intake manifold is carried out by passing air through a booster container before the air enters the intake manifold. The method includes supplying air at atmospheric pressure to a booster container which includes a plurality of deflectors within and attached to the container, passing the air around at least one of the deflectors before the air enters the body of liquid in the booster container, influencing the air in the liquid by a vacuum created in the intake manifold, forming bubbles of the air in the liquid to stabilize the air influenced by the vacuum, passing the air leaving the liquid under vacuum into a liquid compensation chamber and through passages between the deflectors in the booster container to stabilize the stream of air and passing the air under vacuum out of the booster container into an intake manifold of the engine.

The Air-Power Booster is formed by: 1) air-vacuum liquid compensation device or booster component of the system; 2) flexible tubing, optional control valves and accessories that regulate the air flow and allow the adaptation of the system to different sizes and models of engines, as well as to types of fuel delivery systems and fuels used; 3) optional electronic indicators for remote observation (dashboard) which measures the flow and speed of air supplied through the booster, allowing the engine operator or vehicle driver a visual observation of the air flow—speed coming into the engine, while at the same time levels of 'Optimum Fuel Consumption' are indicated.

The main function of the 'Air-Vacuum Liquid Compensation Device', known as "the Booster", is to allow the internal vacuum low pressure (produced during an intake stroke) to aspirate continuously variable mass-volumes of atmospheric air of ambient pressure entering through the booster. This incoming air will easily overcome the surface tension of the liquid contained in the booster, assisted by the vacuum-low pressure present on the opposite side of the liquid. The only resistance that should be overcome by the air passing through, will be the one imposed by the surface tension of the liquid and this can be considered zero or null. On one side of the liquid we find about ambient atmospheric pressure (1 bar=100 kpa=14.5 psi) and on the opposite side: low pressure providing a vacuum (0.1–0.35 bar=10–35 kpa=1.45–5.80 psi). Additionally, the body of liquid providing the liquid compensation or stabilization will act as a non-restrictive dynamic control valve while at same time it acts like a filter, retaining all the extraneous particles found in the air. This is an additional and secondary function of the liquid. As a result of this process, an additional current of clean and compensated air will flow continuously, supplying variable mass-volumes dependent on the operative rotation (rpm) and the volume of total internal displacement of the engine. Due to the fact that the air passing through the body of liquid is converted into bubbles, it will travel upward very fast in an interrupted pattern, but it will never run in a continuous pattern. Running this way, the body of liquid acts like a non-restricted dynamic valve. The compensated or stabilized air current at low pressure enters directly into the intake manifold, filling partially the internal volume of the engine, allowing it to work in a less restrictive condition, more open to the atmosphere, reducing the conditions of extreme-closed high vacuum (excessive low pressure) without failure or disfunction due to decompensation or lack of stabilization. All of this is possible without affecting the function of valves, devices, or accessories dependent on the vacuum which will continue to work in the conventional way, (Exhaust gas recirculation (EGR) valve, spark ignition timing, shift box valve, air-conditioned accessories).

The objectives fulfilled by these new operative working conditions, produced by the constant presence of additional air, filling the internal volume (space) of the engine, imply advantageous changes in the performance of the engine. Bestowing to the 'Air-Power Booster' characteristics that separate it, in a very distinctive and ample manner, from all (thers included in the prior art, while at the same time conforming to the uniqueness of this invention, as explained below.

Significant reduction of fuel usage "per se", while at the same time increasing torque and power is obtained. As we know, air is drawn into the engine with each intake stroke of each piston. The piston moving down on its intake stroke increases cylinder volume and lowers pressure in the cylinder (producing vacuum). With the intake valve open, atmospheric air (at higher positive pressure) rushes in from the intake manifold to fill the cylinder. In simplest terms, air intake occurs because normal atmospheric pressure is higher (pressure from outside toward inside) than the lowest pressure (vacuum implies sudden strong pull) in the cylinder. Air rushes in during the intake stroke, trying to equalize both pressures. In most engines time throttle valve restricts intake air flow. As we open the throttle, the opening to atmospheric pressure raises the manifold pressure. So, in practice, the amount of air that rushes into the cylinder on the intake stroke depends on the difference between the pressure in the intake manifold and the lower pressure in the cylinder. While pressure in the intake manifold depends on throttle opening, the greatest restriction occurs when the throttle is closed or nearly closed (idling, coating, part-throttle acceleration), causing extremely high vacuum conditions, and the engine working at its lowest volumetric efficiency, with the piston aspirating from a close inner space practically empty and lacking air, making great effort and wasting energy during its vacuum production. Here lies the importance of the 'Air-Vacuum Liquid Compensation Device', which allows the internal restricted conditions derived from the throttle valve restrictive operation to change. The 'booster' does not impose any restriction and, furthermore, facilitates the intake of additional air, supplying it directly to the intake manifold in a stable and compensated way. This will imply that most of the aspirated air will be entering mainly through the 'booster'. This new and advantageous event will allow the restrictive air flow coming from the throttle valve (carrying fuel or alone), to become dependent and manageable (under control) by the non-restrictive flow of compensated air originated by the Booster. To a greater flow coming from the booster there will be less flow restricted by the throttle, and vice versa, to a lesser flow of compensated air one will obtain a greater flow restricted by the throttle. In simplest terms, we could say that the amount of air entering directly to the intake manifold could be deduced from the restricted amount of air controlled by the throttle valve.

The following is an example: a carbureted system, V6, 3.0 liters (lt.) engine working at 1000 rpm (idling) will aspirate 1.500 lt. of air-fuel mixture per minute (working at its 100% volumetric efficiency) through its restrictive throttle valve, if we supply through the 'Booster' 33.33% of air related to the total volume aspirated, it will imply that only 1000 lt. of air-fuel mixture will enter through the restrictive throttle valve. As the volume of fuel extracted by the air passing through a venturi system is proportional to the intake air flow, the volume of fuel will be 33.33% less than the volume originally aspirated. This example explains, the fuel reduction for a carbureted engine. For Hi-tech Electronic Fuel Injected Systems, the principle is the same, except that the throttle valve restricts only the intake air, manifold sensors will measure the incoming air, sending electrical signals to the electronic control module (Computer), which calculates the proper amount of fuel to be injected at the ports. The Lambda Sensor measures the amount of oxygen in the exhaust manifold, and determines the deviation of air-fuel mixture combusted in relation to the stoichiometric (Lambda=1) neither rich nor lean air-fuel ratio, or zero excess of air, the resulting voltage (0.1–0.9 volts) of the Lambda Sensor is, registered by the electronic control module, determining the pulse time of electrojectors (electronic injectors). In this way, the control module and Lambda Sensor work jointly in a closed-loop operation, to maintain the air-fuel mixtures as close as possible to the stoichiometric air-fuel ratio. The principle of operation is the same, but the difference is that intaking air through the booster will not be measured by the manifold air flow sensors, making the air-fuel mixture lean for the first time, but the Lambda Sensor will send a low voltage signal (less than 0.45 volts), reporting a lean air-fuel ratio to the control module, which will enrich the next mixture but related to a lower intake air flow measured by the intake manifold air flow sensor. Obviously, the fuel injected will be less. This also, is a fuel reduction "per se". It is very important to highlight that the reduction of fuel consumption "per se", involves, in an implicit way a loss of engine power when the device is not used.

This loss of engine power has been canceled and overcome by the new operative conditions of the engine, derived from the constant presence of stabilized or compensated air coming from the booster. This compensated air flow entering directly through the intake manifold, will partially fill the internal space (volume) of the engine, raising the manifold pressure, implying a significant reduction of maximum vacuum condition, increasing the air flow from the manifold to the cylinder's inner space, thereby increasing the volumetric efficiency of the cylinder, while at the same time, allowing a dramatic reduction of the work-effort of the pistons, which now can intake suctioning from a partially open space and not from the closed-in space with a lack of air under extreme vacuum conditions (excessive low pressure). All this translates into an increase of torque and power produced by the maximum quantity of energy efficiently generated with a minimum volume of fuel. In this way, the Air-Power booster allows a significant reduction of fuel consumption with a noticeable power boost. Additionally, the optional electronic remote observation device which indicates the speed-flow of air entering the 'booster', mentioned above, offers the distinct advantage of observing in real time, the degree of optimum consumption of fuel. This allows the operator to obtain the best operative efficiency of the engine. It is important to mention, that the amount of air supplied by the booster to the intake manifold is easily adjustable and controlled by means of a vacuum meter and a restriction valve, allowing supply of the proper amount of air which will allow use of energy and horsepower previously wasted. This in accordance with the internal displacement volume of different engines.

The concepts set forth above are employed for and have been satisfactorily tested on engines equipped with different fuel delivery systems, for example, carburetors, single injection (central TBI), continuous injection (CIS), multiport fuel injection (MFI), multi-pointsequential fuel injection (SMFI) and air-natural gas mixer-dosifiers, which works with a throttle valve restrictive system.

Similarly, the Air-Power Booster has been tested on a Mercedes Diesel 4L cylinder, equipped with a Diesel direct injection engine, using a throttle valve air flow control. A significant reduction of diesel consumption as well as a significant reduction of black fumes expelled trough the exhaust pipe were reported. In the same way, the Air-Power Booster can also be installed to work in turbo-diesel injected engines. But a solenoid or check valve should be used in order to close the air-vacuum line connecting the booster to the intake manifold. The booster will work during the inactivity period of the Turbo, that is to say during the low rpm range.

Finally, another no less important feature of the uniqueness of the Air-Power Booster is due to the fact that the system works mainly by correcting the previous operational limitations and increasing the engine efficiency and furthermore by improving the efficiency of combustion affecting reducing the byproducts formed. The system may use any fuel delivered by any fuel dispensing system with a restricted air flow control. On the other hand, it is the only system based on the principle of Liquid Compensation of Pressures that allows the adjustable intake of stabilized or compensated air-oxygen without causing failures by destabilization or decompensation, while it reduces significantly the work-effort of the piston during its vacuum production, which at the end translates into an optimal fuel consumption with the least amount of carbon dioxide emitted to the environment.

DETAILED DESCRIPTION OF THE PREFERRED EMBODIMENTS

Figure 1:
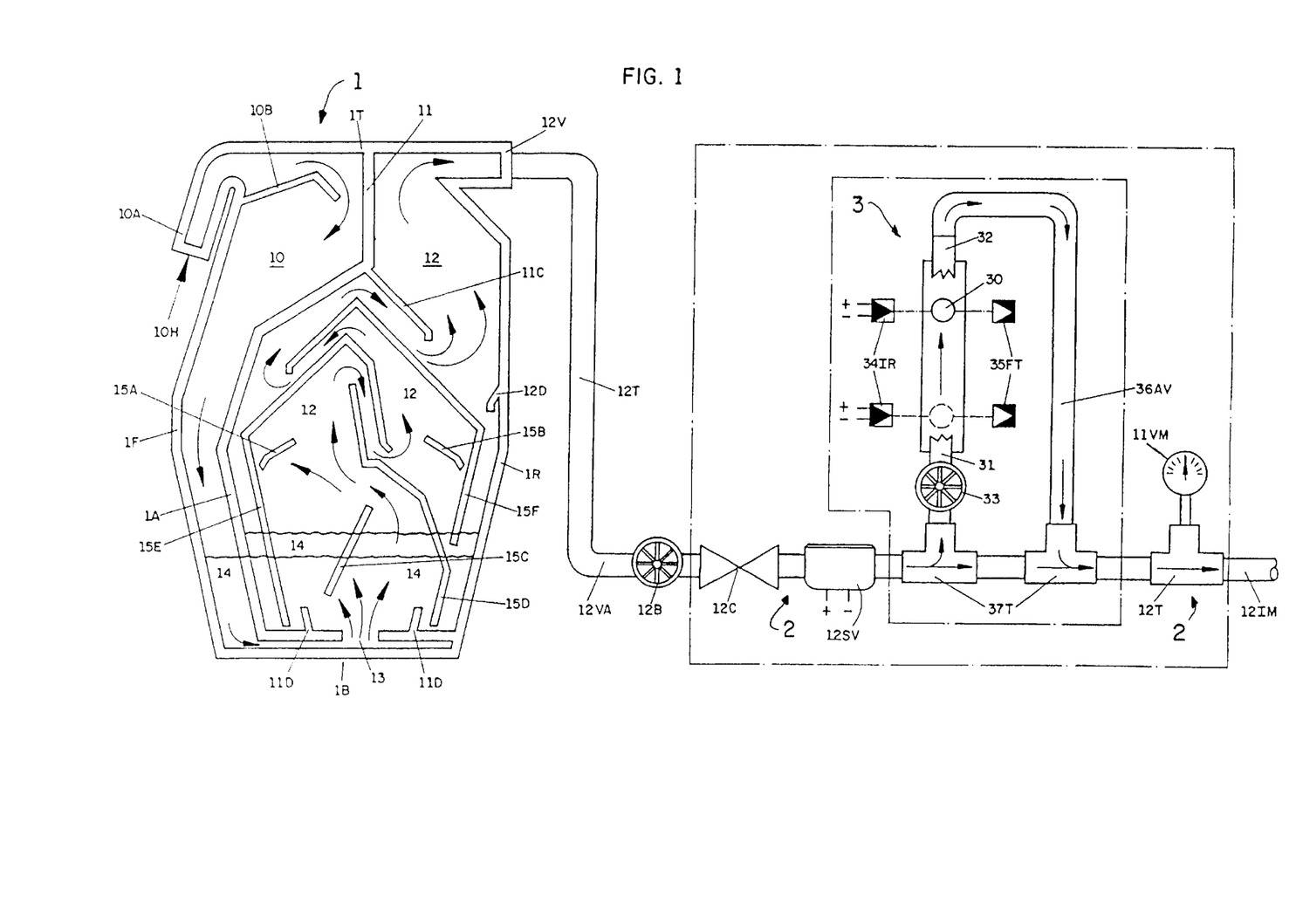
FIG. 1. is a longitudinal sectional view showing a schematic air flow passing through an Air-Power Booster system of the invention as it continues towards the intake manifold of an internal combustion engine (not shown).

FIG. 1 schematically depicts an Air-Power Booster system of the invention, which includes an air-vacuum liquid compensation device 1, accessories to control and regulate the air-vacuum line 12B, 12C, 12SV, and 11VM which allow adequate calibration, installation and use of the system in different types of internal combustion engines, and an optional air speed-flow remote electronic indicator device 3.

1) The air-vacuum liquid compensation device 1, called in short the Booster 1 in the non-limiting example illustrated in cross-section through a center thereof, has a planar front face and rear face and an asymmetric decagonal form due to its internal labyrinth configuration, and is made of a molded polymer container, having exterior measurements of: height 138 mm, width 90 mm, and depth 65 mm. The external walls have 3 mm thickness, while the internal deflection walls hcive 2 mm thickness. The booster 1 includes an inlet nozzle and an outlet nozzle, each having a ⅜ inch I.D., the inlet 10A being inclined downward, and the outlet 12V being disposed substantially horizontally. Internally, booster 1 is divided by an irregular central wall 11 extending from the top wall 1T towards the bottom wall 1B of the booster 1. Wall 11 does not reach the bottom wall 1B. The horizontal portion of wall 11 has a central opening or hole 13 having a diameter of ⅜ inch. There is a 3–8 mm gap between the bottom wall 1B and the horizontal portion of wall 11. The horizontal portion of wall 11 is joined to the rear wall 1R which extends from the outlet nozzle 12V downward to the bottom wall 1B of booster 1.

This configuration creates the liquid compensation chamber 12 which is contained in the booster 1 while at the same time it creates the atmospheric pressure chamber 10, chambers 10 and 12 being divided by the central wall 11 which has at its bottom a pair of smaller deflectors 11D and the ⅜ inch ID central opening 13 interconnecting fluidly the atmospheric pressure chamber 10 with the liquid compensation chamber 12. When the engine is not running (turned off) compensating liquid 14 is found occupying partially the lower portions of both chambers 10 and 12, but when the engine is turned on (running) the compensating liquid 14 will migrate from the chamber 10 through the central opening 13 raising its internal level in the liquid compensation chamber 12. On the other hand, internally the liquid compensation chamber contains two small deflectors 15A and 15B, one central deflector 15C partially immersed in the compensating liquid 14, all of them inclined, and three irregular deflectors 15D, 15E, and 15F with their lower ends inside the liquid compensator 14. The upper ends of each irregular deflector 15D, 15E and 15F are located above and covering each other, whereby deflector 15D is below deflector 15E, and deflector 15E is below deflector 15F, while the central wall 11 has an upper deflector 11C disposed above and covering deflector 15F and at the same time covering all of the upper ends of the deflectors 15D, 15E and 15F. None of the deflectors are joined to each other, but each deflector is fixed to the inner faces of the booster 1.

At the front wall 1F of the high pressure chamber 10, close to the inlet 10A, deflector 10B is located, while at the rear wall 1R of the liquid compensation chamber 12 a small further deflector 12D is located. The general function of each deflector is to make manageable the high speed flow of air under vacuum leaving the compensating liquid 14, while deflecting the compensating liquid 14 which passes into the liquid compensation chamber 12. Such management of the flows of both air and liquid should be highly efficient to avoid migration of the compensating liquid 14 toward outlet nozzle 12V and this assures the exit of a clean liquid-free air flow through the outlet nozzle 12V.

As explained above, the body of compensating liquid 14 contained in the booster 1 acts by working as a non-restrictive dynamic valve because it is open and closed at the same time, where on one side of the compensating liquid 14 there is atmospheric pressure, while on the opposite side of the compensating liquid 14 there is low pressure resulting in a vacuum. The main function of the booster is to draw air from the ambient (at barometric pressure) and to supply the air to the intake manifold as a stable air flow at greatly reduced pressure.

The outlet nozzle 12V is ⅜ inches in internal diameter and is joined by a translucent flexible hose 12T to the control-regulating valves of the air flow. These are a spherical by-pass valve 12B, optional check valve 12C, optional solenoid 12SV, optional remote observation device 3 installed on a pair of T-junctions 37T, and optional vacuum-meter 11VM installed on a T-junction 12T, each having ⅜ inch ID, conforming to the vacuum source-air outlet line 12VA, which ends with the connector 12IM of the intake manifold (not shown). In some cases there is no connection available in the intake manifold for line 12VA. As an alternative, the connection could be made by placing a T-junction in conjunction with the Positive Crank-case Ventilating system (pcv valve/standard for all vehicles). The vacuum source-compensated air outlet line 12VA supplies a negative vacuum low pressure (sudden strong pull) to the outlet nozzle 12V located at the top rear of the booster 1, aspirating freely the internal volume available from the liquid compensation chamber 12 equivalent to 70% of the total volume of the compensation chamber 12, since the retraining 30% is occupied by the volume of the compensating liquid 14, where the ⅜" ID central opening 13 is submerged approximately at a depth of one inch below the surface of the compensating liquid 14. Since starting the engine produces a vacuum low pressure equal to an aspiration around 20 to 27 in.Hg (0.35–0.1 bar) above the liquid surface, and 1 inch below the surface, there is atmospheric pressure of 1 bar (1 bar=ten times higher pressure than 0.1) coming from the central opening 13 fluidly communicating with the ambient pressure chamber 10, which receives the incoming air flow 10H through the inlet nozzle 10A. This implies that the compensating liquid 14 is being pulled from its upper surface by vacuum low pressure, and pressed upward by the higher pressure of incoming air at atmospheric pressure. Both pressures are separated only by the surface tension arid the pressure provided by 1 inch of compensating liquid 14. Thus, the opposed resistance of the liquid can be considered totally null or zero. The compensating liquid forms a non-restrictive valve. The result is the instant creation of a high speed air flow drawn from atmospheric ambient, crossing the compensating liquid 14 and finally exiting through the outlet nozzle 12V, and subsequently accessing the vacuum source-compensated air line 12VA reaching the intake manifold. The air flow breaks up into bubbles as it travels through the compensating liquid 14 and the air/liquid mixture moves dynamically in the lower portions of chamber 12, always being returned downward by the deflectors, thereby keeping the liquid away from the exit nozzle 12V.

The compensated air flow entering the vacuum source-compensated air line 12V should be regulated according to the particular characteristics of each engine in terms of: internal displacement volume, fuel delivery system, and fuel used. Outlet 12V is connected to a translucent flexible hose 12T which ends in the intake manifold connection 12IM conforming to the vacuum source-compensated air line 12VA. To this time 12VA should be connected during installing the control regulating valves for the compensated air flow: spheric by-pass valve 12B, check valve 12C, solenoid 12SV, and vacuum meter 11VM installed on a T-junction. Each having ⅜ OD, these are optional accessories, and could be present in the line but are not indispensable to the performing of the system. Turbo engines require an indispensable check valve 12C and a solenoid valve 12VS as standard equipment.

It is important to point out that the booster works under a wide range of different pressures depending on driving conditions. During conditions of maximum acceleration (W.O.T.) at wide open throttle, internal reading of vacuum low pressure comes close to zero (0 in. Hg.) where the engine behaves as any normal engine without the air power booster. Here lies the importance of the optional speed-flow remote indicator device 3, to be inserted optionally over the vacuum source-compensated air line 12VA. This includes a pair of T-junctions 37 T, a spherical by-pass valve 33, flexible hose 36AV, and the electronic device 3 itself. This device 3 includes a transparent tube ½ inch outside diameter (O.D.) and ⅜ inch inside diameter and 2 inches in height. Each end carries a small nozzle ⅜ inch O.D.: lower nozzle 31, upper nozzle 32, both nozzles 31 and 32 being designed to make contact with a metal sphere 30, but without obstructing the flow of high speed air. Lower nozzle 31 is fluidly connected to the by-pass valve 33 which regulates the air flow at the lower side, and the upper nozzle 32 is fluidly connected to the flexible hose 36AV (¼ inch I.D.) while at the same time is connected to a T-junction 37. The lower nozzle 32 is fluidly connected to the by-pass valve 33 fluidly connected to another T-junction 37. Both T-junctions are optionally inserted in the vacuum source compensated air line 12VA. The by-pass valve 33 regulates the high speed air flow through the transparent tube, causing the metal sphere 30 to float in an antigravity fashion. Both positions of the metal sphere 30 inside the transparent tube (top and bottom) are registered by the electronic indicator device 3, which is provided externally with two infrared diodes 34IR and two photo transistors 35FR located at opposite sides of the transparent tube. The metal sphere 30 will interrupt the infrared ace light and the interruption will generate an electrical signal sent to a bar graph lead (not shown in the drawing) which can be observed remotely (example, dashboard). The top position of the metal sphere represents the optimal level of fuel consumption while the bottom position represents the lower level. This way the operator of the engine or driver is aided to perform efficiently.

In tests using a booster device and method described herein both the carbon dioxide emissions and the fuel consumption were reduced. In the tables shown below, results are shown in which a 1996 Ford Taurus and a 1996 Ford Thunderbird were tested without (base line) and with a booster device attached. Both the Ford Taurus and the Ford Thunderbird tested were 1996 V-6 models with electronic fuel-injection systems. The tests were performed by an E.P.A. approved Independent Testing Laboratory. The FTP-75 test is a test used by E.P.A. to determine fuel emissions, HFET is a test used by E.P.A. time determine fuel economy and HOT 505 is the last portion of the FTP-75 test, simulating city driving in Los Angeles.

|  | HC (g/m) | CO (g/m) | NOx (g/m) | CO2 (g/m) | FE (mpg) |
|---|---|---|---|---|---|
| FTP-75 | | | | | |
| TAURUS | | | | | |
| Base Line: | 0.11 | 0.92 | 0.15 | 420.50 | 21.02 |
| With Device | 0.11 | 0.90 | 0.19 | 365.50 | 24.16 |
| % Change | | | | −13.08% | 14.94% |
| THUNDERBIRD | | | | | |
| Base Line: | 0.10 | 0.66 | 0.09 | 392.70 | 22.52 |
| With Device | 0.09 | 0.66 | 0.09 | 376.70 | 23.48 |
| % Change | | | | −4.07% | 4.26% |
| HFET | | | | | |
| TAURUS | | | | | |
| Base Line: | 0.02 | 0.13 | 0.04 | 296.11 | 29.96 |
| With Device | 0.02 | 0.20 | 0.05 | 244.74 | 36.21 |
| % Change | | | | −17.35% | 20.88% |
| THUNDERBIRD | | | | | |
| Base Line: | 0.02 | 0.07 | 0.02 | 301.00 | 29.47 |
| With Device | 0.02 | 0.08 | 0.02 | 254.,70 | 34.82 |
| % Change | | | | −15.38% | 18.15% |

|  | HC (g/m) | CO (g/m) | NOx (g/m) | CO2 (g/m) | FE (mpg) |
|---|---|---|---|---|---|
| HOT 505 | | | | | |
| THUNDERBIRD | | | | | |
| Base Line: | 0.01 | 0.03 | 0.01 | 363.90 | 24.39 |
| With Device | 0.02 | 0.01 | 0.01 | 285.40 | 31.09 |
| % Change | | | | −21.57% | 27.47% |

Compensating Liquid 14

This liquid performs an important function as the separating medium of the two opposite pressures: low pressure (vacuum) and high pressure (ambient), each acting in the same sense. This fact offers the booster 1 a wide range of work enabling it to supply additional air-oxygen with low pressures providing a vacuum of as high as 30 in. Hg and as low as 3 in. Hg. which is the minimum limit for the engine to perform similarly to any other engine without the booster.

The only resistance to the air flow as it goes through the compensating liquid of the booster 1, is produced by the surface tension of the liquid. Due to its density and viscosity, it could be affected by working temperatures. The selected liquid must carry out the compensation or stabilization process under any climatic working conditions. Example: mineral oil is very adequate to work at below zero temperatures, since it does not freeze and can keep an appropriate viscosity. Any engine oil SAE 30 offers appropriate results in more benign climates. Where temperatures ma; run above 100° F., it would be recommended to use engine oil SAE 50–60. Oil mixtures are also suitable for use in the booster container. Other liquids capable of functioning in this way may also be used. The compensation liquid is not generally consumed, but it is convenient to replace it periodically in order to discard any dust particles retained and accumulated at the bottom of the booster. The translucent flexible hoses allow a visual observation of the internal level and liquid condition (engine off). To replace the compensating liquid, all that must be done is to disconnect the booster unit, turn it upside down and empty its contents. Later, the booster can be filled again, up to the marked level.

Additional Uses of the Booster

The properties of each particular liquid, allow the booster 1 to be used as a way to supply high concentrations of extra oxygen. Methanol ($CH_3OH$), which is volatile and inflammable, contains 50% by weight of molecular oxygen, and may be used in the booster as the compensating liquid. Use of methanol will allow a flow of air, which provides a load of 50% of extra oxygen entering the combustion chamber. Therefore, the booster will behave as a chemical supercharger, mostly applied in modified sport engines. For this special use, the booster must have an optional accessory to constantly replace the volume of methanol being consumed by evaporation. In the same way, the booster can be used to supply any chemical liquid having properties which can be advantageous due to their intrinsic physical-chemical characteristics.

Although a preferred embodiment of the invention has been herein described, it will be appreciated that some changes in structure can be effected without departure from the basic principles of the invention. Such changes are deemed to be included in the spirit and scope of the invention as defined by the appended claims and equivalents thereof.

What is claimed is:

1. A device for improving fuel consumption and reducing carbon dioxide exhaust emissions in an internal combustion engine that generates a vacuum in operation, said device comprising:

a booster container body comprising an inlet chamber, an outlet chamber, an inlet port for receiving air into said inlet chamber, and an outlet port for discharging air from said outlet chamber;

a body of liquid partially filling said inlet chamber and said outlet chamber; and deflectors located within and attached to said booster container body, said deflectors comprising elongated deflecting members, said elongated deflecting members including a wall member that is spaced apart from the bottom of said booster container body to define a passageway under said wall member for communicating said inlet chamber with said outlet chamber, yet said wall member otherwise partitioning said inlet chamber from said outlet chamber, said wall member being partially immersed in said body of liquid and arranged so that air entering said inlet chamber through said inlet port is guided by said wall member into said body of liquid and under said wall member to said outlet chamber before discharging through said outlet port, wherein a plurality of said elongated deflecting members collectively define a labyrinth of passages in said outlet chamber.

2. A device according to claim 1, wherein said body of liquid comprises a member selected from the group consisting of mineral oil, engine oil, oil mixtures and methanol.

3. A device according to claim 1, wherein said booster container body is made of molded plastic polymer.

4. A device according to claim 1, wherein at least two of said elongated deflecting members are partially immersed in the liquid.

5. A device according to claim 1, wherein some of said elongated deflecting members are spaced from each other.

6. A device according to claim 1, wherein said inlet port and said outlet port are not disposed remotely from said body of liquid.

7. A device according to claim 1, wherein at least two of said elongated deflecting members are directly fixed to each other.

8. A device for improved fuel consumption and reducing carbon dioxide exhaust emissions in an internal combustion engine having an intake manifold to which said device is connectable, the intake manifold generating a vacuum when the internal combustion engine is in operation, said device comprising:

a booster container body comprising an inlet chamber, an outlet chamber, an inlet port for receiving air into said inlet chamber, and an outlet port for discharging air from said outlet chamber, said outlet port being operatively connectable to the intake manifold;

a body of liquid partially filling said inlet chamber and said outlet chamber; and deflectors located within and attached to said booster container body, said deflectors comprising elongated deflecting members, said elongated deflecting members including a wall member that is spaced apart from the bottom of said booster container body to define a passageway under said wall member for communicating said inlet chamber with said outlet chamber, yet said wall member otherwise partitioning said inlet chamber from said outlet chamber, said wall member being partially immersed in said body of liquid and arranged so that air entering said inlet chamber through said inlet port is guided by said wall member into said body of liquid and under said wall member to said outlet chamber before discharging through said outlet port, wherein a plurality of said elongated deflecting members collectively define a labyrinth of passages in said outlet chamber, and wherein operative connection of the outlet port to the intake manifold causes the vacuum generated by the internal combustion engine in operation to aspirate air from the inlet chamber to said outlet chamber by passing air under said wall member and through said body of liquid.

9. A device according to claim 8, wherein the body of liquid comprises a member selected from the group consisting of mineral oil, engine oil, oil mixtures and methanol.

10. A device according to claim 8, wherein said booster container body is made of molded plastic polymer.

11. A device according to claim 8, wherein at least two of said elongated deflecting members are partially immersed in the liquid.

12. A device according to claim 8, wherein some of said elongated deflecting members are spaced from each other.

13. A device according to claim 8, wherein said inlet port and said outlet port are disposed remotely from said body of liquid.

14. A device according to claim 8, wherein at least two of said elongated deflecting members are not directly fixed to each other.

15. A method for improving fuel consumption and reducing carbon dioxide exhaust emissions in an operating internal combustion engine having an intake manifold, said method comprising:

supplying air to a booster container, the booster container comprising:
- a booster container body comprising an inlet chamber, an outlet chamber, an inlet port for receiving air into the inlet chamber, and an outlet port for discharging air from the outlet chamber, the outlet port being operatively connected to an intake manifold of an internal combustion engine;
- a body of liquid partially filling the inlet chamber and the outlet chamber, the body of liquid not being supplied to the internal combustion engine as a fuel source; and
- deflectors located within and attached to the booster container body, the deflectors comprising elongated deflecting members, the elongated deflecting members including a wall member that is spaced apart from the bottom of said booster container to define a passageway under said wall member for communicating the inlet chamber with the outlet chamber, yet the wall member otherwise partitioning the inlet chamber from the outlet chamber, the wall member being partially immersed in the body of liquid;

generating a vacuum with the internal combustion engine to aspirate the air in the inlet chamber through the body of liquid and under the wall member as air bubbles before reaching the outlet chamber; and passing air reaching the outlet chamber through passages defined between the deflectors to form a stabilized stream of air; and passing the stabilized stream of air out of the booster container body into an intake manifold of the engine while retaining the liquid in the booster container body.

16. A method according to claim 15, wherein at least two of the elongated deflecting members are not directly fixed to each other.

17. A method according to claim 15, wherein a plurality of the elongated deflecting members collectively define a labyrinth of passages in the outlet chamber.

18. A method according to claim 15, wherein the body of liquid comprises a member selected from the group consisting of mineral oil, engine oil and methanol.

19. A device for improving fuel consumption and reducing carbon dioxide exhaust emissions in an internal combustion engine that generates a vacuum in operation, said device comprising:

a booster container body comprising an inlet chamber, an outlet chamber, an inlet port for receiving air into said inlet chamber, and an outlet port for discharging air from said outlet chamber;

a body of liquid partially filling said inlet chamber and said outlet chamber, said body of liquid not being supplied to the internal combustion engine as a fuel source; and deflectors located within and attached to said booster container body, said deflectors comprising elongated deflecting members, said elongated deflecting members including a wall member that is spaced apart from the bottom of said booster container body to define a passageway under said wall member for communicating said inlet chamber with said outlet chamber, yet said wall member otherwise partitioning said inlet chamber from said outlet chamber, said wall member being partially immersed in said body of liquid and arranged so that air entering said inlet chamber through said inlet port is guided by said wall member into said body of liquid and under said wall member to said outlet chamber before discharging through said outlet port.

20. A device according to claim 19, wherein said body of liquid comprises a member selected from the group consisting of mineral oil, engine oil, oil mixtures and methanol.

21. A device according to claim 19, wherein said booster container body is made of molded plastic polymer.

22. A device according to claim 19, wherein at least two of said elongated deflecting members are partially immersed in the liquid.

23. A device according to claim 19, wherein some of said elongated deflecting members are spaced from each other.

24. A device according to claim 19, wherein said inlet port and said outlet port are disposed remotely from said body of liquid.

25. A device according to claim 19, wherein at least two of said elongated deflecting members are not directly fixed to each other.

26. A device according to claim 19, wherein a plurality of said elongated deflecting members collectively define a labyrinth of passages in said outlet chamber.

27. A device for improved fuel consumption and reducing carbon dioxide exhaust emissions in an internal combustion engine having an intake manifold to which said device is connectable, the intake manifold generating a vacuum when the internal combustion engine is in operation, said device comprising:

a booster container body comprising an inlet chamber, an outlet chamber, an inlet port for receiving air into said inlet chamber, and an outlet port for discharging air from said outlet chamber, said outlet port being operatively connectable to the intake manifold;

a body of liquid partially filling said inlet chamber and said outlet chamber, said body of liquid not being supplied to the internal combustion engine as a fuel source for the internal combustion engine; and deflectors located within and attached to said booster container body, said deflectors comprising elongated deflecting members, said elongated deflecting members including a wall member that is spaced apart from the bottom of said booster container body to define a passageway under said wall member for communicating said inlet chamber with said outlet chamber, yet said wall member otherwise partitioning said inlet chamber from said outlet chamber, said wall member being partially immersed in said body of liquid and arranged so that air entering said inlet chamber through said inlet port is guided by said wall member into said body of liquid and under said wall member to said outlet chamber before discharging through said outlet port, wherein operative connection of the outlet port to the intake manifold causes the vacuum generated by the internal combustion engine in operation to aspirate air from the inlet chamber to said outlet chamber by passing air under said wall member and through said body of liquid.

28. A device according to claim 27, wherein said body of liquid comprises a member selected from the group consisting of mineral oil, engine oil, oil mixtures and methanol.

29. A device according to claim 27, wherein said booster container body is made of molded plastic polymer.

30. A device according to claim 27, wherein at least two of said elongated deflecting members are partially immersed in the liquid.

31. A device according to claim 27, wherein some of said elongated deflecting members are spaced from each other.

32. A device according to claim 27, wherein said inlet port and said outlet port are disposed remotely from said body of liquid.

33. A device according to claim 27, wherein at least two of said elongated deflecting members are not directly fixed to each other.

34. A device according to claim 27, wherein a plurality of said elongated deflecting members collectively define a labyrinth of passages in said outlet chamber.

35. A device according to claim 1, wherein a portion of said labyrinth of passages is disposed above said body of liquid.

36. A device according to claim 8, wherein said labyrinth of passages is disposed above said body of liquid.

37. A method according to claim 17, wherein the labyrinth of passages is disposed above the body of liquid.

38. A device according to claim 26, wherein said labyrinth of passages is disposed above said body of liquid.

39. A device according to claim 34, wherein said labyrinth of passages is disposed above said body of liquid.

40. A device for improving fuel consumption and reducing carbon dioxide exhaust emissions in an internal combustion engine that generates a vacuum in operation, said device comprising:

a booster container body comprising an inlet chamber, an outlet chamber, an inlet port for receiving air into said inlet chamber, and an outlet port for discharging air from said outlet chamber;

a body of liquid partially filling said inlet chamber and said outlet chamber; and deflectors located within and attached to said booster container body, said deflectors comprising elongated deflecting members, said elongated deflecting members including a wall member that divides said booster container body into said inlet chamber and said outlet chamber, said wall member being partially immersed in said body of liquid so that air entering said inlet chamber through said inlet port passes through said body of liquid and under said wall member to said outlet chamber before discharging through said outlet port, wherein a plurality of said elongated deflecting members collectively define a labyrinth of passages in said outlet chamber, said labyrinth of passages being disposed above said body of liquid.

* * * * *